US012180783B1

(12) United States Patent
Flannery et al.

(10) Patent No.: US 12,180,783 B1
(45) **Date of Patent: *Dec. 31, 2024**

(54) GATE APPARATUS WITH SPRINGLESS AUTOMATIC RETURN GATE

(71) Applicant: Carlson Pet Products, Inc., Burnsville, MN (US)

(72) Inventors: Mark A. Flannery, Longboat Key, FL (US); Porter R. Million, Minneapolis, MN (US)

(73) Assignee: Carlson Pet Products, Inc., Longboat Key, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,908

(22) Filed: Aug. 22, 2023

Related U.S. Application Data

(63) Continuation of application No. 17/396,696, filed on Aug. 7, 2021, now Pat. No. 11,767,708, which is a (Continued)

(51) Int. Cl.

| | |
|---|---|
| ***E06B 9/02*** | (2006.01) |
| ***E05B 17/20*** | (2006.01) |
| ***E05B 63/14*** | (2006.01) |
| ***E05B 63/24*** | (2006.01) |
| ***E05B 65/00*** | (2006.01) |
| ***E05C 1/10*** | (2006.01) |
| ***E05C 1/12*** | (2006.01) |
| ***E05F 1/06*** | (2006.01) |
| ***E05F 3/18*** | (2006.01) |

(Continued)

(52) U.S. Cl.
CPC ............ *E06B 7/32* (2013.01); *E05B 17/2038* (2013.01); *E05B 63/14* (2013.01); *E05B 63/244* (2013.01); *E05B 65/0007* (2013.01); *E05C 1/10* (2013.01); *E05C 1/12* (2013.01); *E05F 1/068* (2013.01); *E05F 3/18* (2013.01); *E05F 3/20* (2013.01); *E05F 15/50* (2015.01); *E06B 9/02* (2013.01); *E06B 9/04* (2013.01); *E06B 11/022* (2013.01); *E05Y 2800/426* (2013.01); *E05Y 2900/40* (2013.01); *E06B 2009/002* (2013.01); *Y10T 292/0976* (2015.04)

(58) Field of Classification Search
CPC ........ E06B 2009/002; E06B 9/02; E06B 9/04; E06B 7/32; E06B 11/022; E05B 63/244; E05B 63/14; E05B 65/007; E05B 17/2038; E05F 1/068; E05F 3/18; E05F 3/20; E05F 15/50; E05C 1/12; E05C 1/10
See application file for complete search history.

(56) References Cited

U.S. PATENT DOCUMENTS

| | | |
|---|---|---|
| 934,876 A | 9/1909 | Barker |
| 1,242,757 A | 10/1917 | Anway |

(Continued)

*Primary Examiner* — Abe Massad

(57) ABSTRACT

A gate apparatus having an automatically returning gate, an upper latch operated by an upper button, and a lower latch operated by an upper finger handle. Each of the latches must be opened to open the gate. The gate returns without the aid of a spring to a position close to the closed position or to the closed position by the structure of a pivot or hinge connection between the gate and the frame of the gate. Gate tubes are rectangular in section for their entire length. Wood panels are included in the gate and excluded from other portions of the gate apparatus to make the gate stand out to the user seeking to open the gate.

2 Claims, 6 Drawing Sheets

Related U.S. Application Data continuation of application No. 16/569,667, filed on Sep. 12, 2019, now Pat. No. 11,085,233, which is a continuation of application No. 15/451,255, filed on Mar. 6, 2017, now Pat. No. 10,415,290, which is a continuation of application No. 14/106,834, filed on Dec. 15, 2013, now Pat. No. 9,587,426, which is a continuation of application No. 13/337,718, filed on Dec. 27, 2011, now Pat. No. 8,607,502.

(51) Int. Cl.

| | |
|---|---|
| ***E05F 3/20*** | (2006.01) |
| ***E05F 15/50*** | (2015.01) |
| ***E06B 7/32*** | (2006.01) |
| ***E06B 9/04*** | (2006.01) |
| ***E06B 11/02*** | (2006.01) |
| *E06B 9/00* | (2006.01) |

(56) References Cited

U.S. PATENT DOCUMENTS

| | | | |
|---|---|---|---|
| 1,412,769 | A | 4/1922 | Barnes |
| 1,439,542 | A | 12/1922 | Peter |
| 1,594,896 | A | 8/1926 | Mighell |
| 1,944,386 | A | 1/1934 | Winslow |
| D145,059 | S | 6/1946 | Bult |
| 2,573,061 | A | 10/1951 | Raymond |
| 2,766,015 | A | 10/1956 | Farmer |
| 3,107,390 | A | 10/1963 | Shelton |
| 3,282,617 | A | 11/1966 | Wason |
| 4,628,635 | A | 12/1986 | Maillard |
| 5,060,421 | A | 10/1991 | Castelli |
| 5,265,311 | A | 11/1993 | Gard |
| 5,272,840 | A | 12/1993 | Knoedler et al. |
| 5,809,694 | A | 9/1998 | Postans |
| 6,073,396 | A | 6/2000 | Kietzmann |
| 6,112,461 | A | 9/2000 | Cheng |
| 6,499,254 | B2 | 12/2002 | Rossman et al. |
| 6,516,568 | B2 | 2/2003 | Yang |
| 6,681,720 | B1 | 1/2004 | Skurdalsvold |
| D486,586 | S | 2/2004 | Cantley |
| 6,711,854 | B1 | 3/2004 | Andersen |
| 7,121,531 | B1 | 10/2006 | Gonzalez |
| 7,152,372 | B2 | 12/2006 | Cheng |
| 7,393,024 | B2 | 7/2008 | Bella |
| 7,520,542 | B1 | 4/2009 | Price |
| 7,540,046 | B1 | 6/2009 | Lai |
| 7,887,029 | B2 | 2/2011 | Flannery |
| 7,950,184 | B2 | 5/2011 | Flannery |
| 7,975,431 | B2 | 7/2011 | Flannery |
| 8,448,381 | B2 | 5/2013 | Flannery |
| 8,607,502 | B2 | 12/2013 | Flannery et al. |
| 8,615,928 | B2 * | 12/2013 | Wang .................... E04H 17/013 49/55 |
| 8,640,761 | B2 | 2/2014 | Potter |
| 8,713,853 | B2 * | 5/2014 | Toro .......................... E06B 9/04 49/381 |
| 9,097,050 | B2 * | 8/2015 | Yates ...................... E05F 1/068 |
| 9,127,496 | B1 | 9/2015 | Flannery |
| 9,458,668 | B1 | 10/2016 | Flannery |
| 9,915,093 | B2 | 3/2018 | Weisbeck |
| 10,287,819 | B1 | 5/2019 | Flannery |
| 2002/0007597 | A1 | 1/2002 | Wang |
| 2003/0009945 | A1 | 1/2003 | Cheng |
| 2003/0110704 | A1 | 6/2003 | Cheng |
| 2005/0028947 | A1 | 2/2005 | Waldman |
| 2006/0169217 | A1 | 8/2006 | Glassford |
| 2007/0074453 | A1 | 4/2007 | Flannery |
| 2008/0185566 | A1 | 8/2008 | Flannery |
| 2008/0202047 | A1 | 8/2008 | Flannery |
| 2008/0265233 | A1 | 10/2008 | Flannery |
| 2009/0293363 | A1 | 12/2009 | Flannery |
| 2010/0083577 | A1 | 4/2010 | Flannery et al. |
| 2011/0175046 | A1 | 7/2011 | Flannery et al. |
| 2011/0225890 | A1 | 9/2011 | Greenwood et al. |
| 2012/0055092 | A1 | 3/2012 | Boucquey |
| 2012/0255234 | A1 | 10/2012 | Wang |
| 2012/0324792 | A1 | 12/2012 | Bertsch |

* cited by examiner

GATE APPARATUS WITH SPRINGLESS AUTOMATIC RETURN GATE

This application is a continuation of U.S. patent application Ser. No. 17/396,696 filed Aug. 7, 2021 and claims the benefit thereof under 35 U.S.C. § 120, which application is a continuation of U.S. patent application Ser. No. 16/569,667 filed Sep. 12, 2019 (U.S. Pat. No. 11,085,233 issued Aug. 10, 2021) and claims the benefit thereof under 35 U.S.C. § 120, which application is a continuation of U.S. patent application Ser. No. 15/451,255 filed Mar. 6, 2017 (U.S. Pat. No. 10,415,290 issued Sep. 17, 2019) and claims the benefit thereof under 35 U.S.C. § 120, which application is a continuation of U.S. patent application Ser. No. 14/106,834 filed Dec. 15, 2013 (U.S. Pat. No. 9,587,426 issued Mar. 7, 2017) and claims the benefit thereof under 35 U.S.C. § 120, which application is a continuation of U.S. patent application Ser. No. 13/337,718 filed Dec. 27, 2011 (U.S. Pat. No. 8,607,502 issued Dec. 17, 2013) and claims the benefit thereof under 35 U.S.C. § 120, all of which applications are hereby incorporated by reference in their entireties into this application.

FIELD OF THE INVENTION

The present invention relates to a gate apparatus for a passageway of a home or residence, to a gate apparatus having a gate that, after being opened, returns in the direction of the closed state without the aid of a spring under the influence of gravity, and to a gate apparatus having upper and lower latches, where the upper latch extends horizontally from a frame to the gate and where the lower latch extends vertically from the gate to a frame.

BACKGROUND OF THE INVENTION

A home or residence includes passageways. One passageway may lead into and out of the kitchen. Another passageway may be at the top of a staircase. Another passageway may be at a bottom of a staircase. These passageways may or may not include doors.

A barrier may be positioned in such a passageway to keep small children or pets, such as dogs, in or out of a certain room, or to keep children from climbing or falling down a staircase. A barrier may include a gate.

The barrier may be a pressure gate apparatus that squeezes itself between two opposing vertical surfaces such as two walls. The pressure gate apparatus may be set up off the floor or may make contact with the floor. The barrier may be fixed to and between two opposing vertical surfaces, such as with screws, and without being squeezed between the two walls. The barrier may be a free standing gate apparatus such as where two opposing walls do not present themselves.

A gate in a barrier may have features in common with a conventional door, door handle and latch. A gate may be configured to open with one hand. A gate may have a latch that is opened by rotating a handle. Fortunately or unfortunately, small children can easily open doors. Fortunately or unfortunately, small children can easily close doors.

SUMMARY OF THE INVENTION

A feature of the present invention is the provision in a gate apparatus, of a barrier frame and a gate swingably engaged to the barrier frame, where the gate automatically returns to a position close to the closed position or to the closed position without the aid of a spring.

Another feature of the present invention is the provision in a gate apparatus, of a barrier frame and a gate swingably engaged to the barrier frame, where the gate includes vertical and horizontal support members, where the barrier frame includes vertical and horizontal support members, and where an axis on which the gate pivots is oblique relative to the vertical and horizontal support members of the gate and of the barrier frame such that the gate returns automatically to a closed position or close to a closed position.

Another feature of the present invention is the provision in a gate apparatus, of a barrier frame and a gate swingably engaged to the barrier frame, where the gate includes vertical and horizontal support members, where the barrier frame includes vertical and horizontal support members, and where an axis on which the gate pivots includes both vertical and horizontal components such that the gate returns automatically to a closed position or close to a closed position under the influence of gravity.

Another feature of the present invention is the provision in a gate apparatus, of a barrier frame and a gate swingably engaged to the barrier frame with a pivot connection, of a first face of the pivot connection being fixed relative to the gate and being oblique relative to an axis of the pivot connection so as to slightly tilt the axis of the pivot connection so as to provide a horizontal component to the axis of the pivot connection.

Another feature of the present invention is the provision in a gate apparatus, of a barrier frame and a gate swingably engaged to the barrier frame with a pivot connection, of the second face being fixed relative to the barrier frame and being oblique relative to an axis of the pivot connection so as to slightly tilt the axis of the pivot connection so as to provide a horizontal component to the axis of the pivot connection.

Another feature of the present invention is the provision in a gate apparatus, of a barrier frame, a gate swingably engaged to the barrier frame, a first latch apparatus running from the gate to the barrier frame, and a second latch apparatus running from the barrier frame to the gate, where the first latch apparatus includes a finger handle on an upper portion of the gate and a lower latch extending from a lower portion of the gate and interacting with a lower horizontal support member of the barrier frame.

Another feature of the present invention is the provision in a gate apparatus, of a barrier frame, a gate swingably engaged to the barrier frame, a first latch apparatus running from the gate to the barrier frame, and a second latch apparatus running from the barrier frame to the gate, where the second latch apparatus includes a button on an upper portion of the barrier frame and an upper latch extending from an upper portion of the barrier frame and interacting with an upper portion of the gate.

Another feature of the present invention is the provision in a gate apparatus, of a barrier frame, a gate swingably engaged to the barrier frame, a first latch apparatus running from the gate to the barrier frame, and a second latch apparatus running from the barrier frame to the gate, where, for the gate to be opened, each of first and second latches of the first and second latch apparatus must be disengaged from the barrier frame and gate, respectively.

Another feature of the present invention is the provision in a gate apparatus, of a barrier frame, a gate swingably engaged to the barrier frame, a first latch apparatus running from the gate to the barrier frame, and a second latch apparatus running from the barrier frame to the gate, where the first latch apparatus includes a finger handle that is configured to operate in the vertical direction such that the finger handle is lifted to draw a lower latch upwardly and out of engagement with a lower horizontal support member of the barrier frame.

Another feature of the present invention is the provision in a gate apparatus, of a barrier frame, a gate swingably engaged to the barrier frame, a first latch apparatus running from the gate to the barrier frame, and a second latch apparatus running from the barrier frame to the gate, where the second latch apparatus includes a button that is configured to be pushed downwardly along a vertical axis and wherein an upper latch is configured to be drawn inwardly into a second end of the barrier frame along a horizontal axis.

Another feature of the present invention is the provision in a gate apparatus, of a barrier frame, a gate swingably engaged to the barrier frame, a first latch apparatus running from the gate to the barrier frame, and a second latch apparatus running from the barrier frame to the gate, where the first and second latch apparatus are configured to require equal and opposite motions for a successful opening of the gate.

Another feature of the present invention is the provision in a gate apparatus, of a barrier frame, a gate swingably engaged to the barrier frame, a first latch apparatus running from the gate to the barrier frame, and a second latch apparatus running from the barrier frame to the gate, where the first latch apparatus includes a spring between a finger handle and a lower latch, with the spring biasing the lower latch to a closed position such that a tension is provided to the finger handle when the finger handle draws the lower latch out of engagement with a lower horizontal support member of the barrier frame.

Another feature of the present invention is the provision in a gate apparatus, of a barrier frame, a gate swingably engaged to the barrier frame, a first latch apparatus running from the gate to the barrier frame, and a second latch apparatus running from the barrier frame to the gate, where the second latch apparatus includes a spring between a button and an upper latch, with the spring biasing the upper latch to a closed position such that a tension is provided when the button is pushed in to draw the upper latch out of engagement with the gate.

Another feature of the present invention is the provision in a gate apparatus, of a barrier frame, a gate swingably engaged to the barrier frame, a first latch apparatus running from the gate to the barrier frame, and a second latch apparatus running from the barrier frame to the gate, where a finger handle of the first latch apparatus confronts a button of the second latch apparatus.

Another feature of the present invention is the provision in a gate apparatus, of a barrier frame, a gate swingably engaged to the barrier frame, a first latch apparatus running from the gate to the barrier frame, and a second latch apparatus running from the barrier frame to the gate, where, when the lower latch engages the barrier frame and when the upper latch engages the gate, the finger handle and the button are generally aligned in the horizontal direction.

An advantage of the present invention is child safety. A feature contributing to this advantage is the inclusion of two latches that are configured such that a) each of the latches must be operated such that the gate can successfully be opened, b) the latches must be operated at the same time such that the gate can successfully be opened, and c) the latches snap into a closed position when the gate is closed and do so automatically without user intervention.

Another advantage is that the gate will tend to return to a position close to a closed position or to the closed position regardless of the attention that a user gives to the gate after opening the gate. If the user opens the gate, then lets go of the gate, the gate will automatically close or will automatically return close to the plane of the barrier frame, i.e., to a position that confronts the closed position. A feature contributing to this advantage is the structural design of the pivot connection between the gate and the barrier frame. Another feature contributing to this advantage is the absence of a spring in such a pivot connection.

DESCRIPTION

Figure 1:
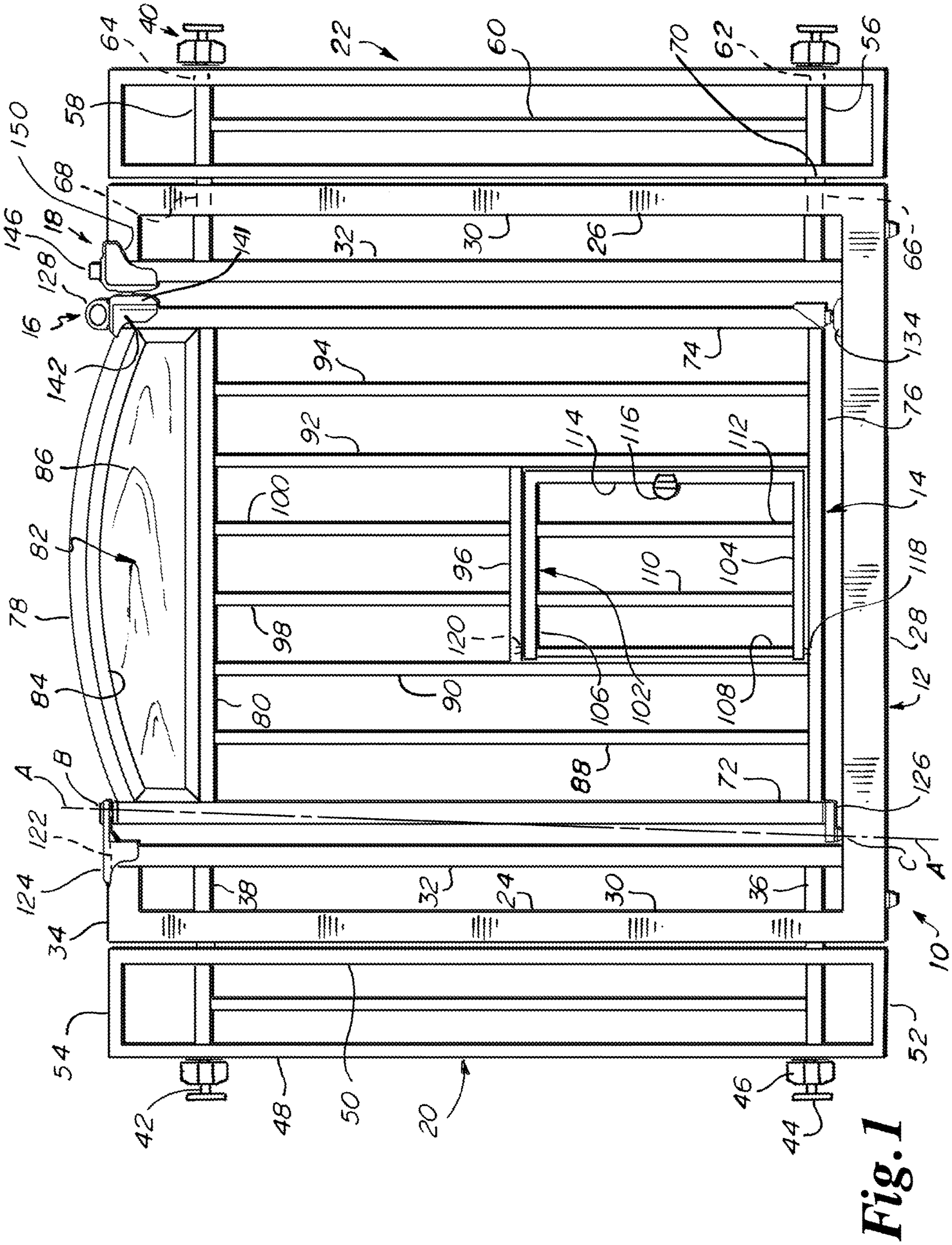
FIG. 1 is a front view of the present gate apparatus.

The present gate apparatus is shown in FIG. 1 and is indicated by reference number 10. Gate apparatus 10 includes a main frame 12, a gate 14 swingably engaged to the main frame 12, a first latch apparatus 16, a second latch apparatus 18, a first extension 20 and a second extension 22. One or more extensions 20 and 22 may be utilized for passageways of greater width. Main frame 12, gate 14, first and second latch apparatus 16, 18, and first and second extensions 20, 22 generally fall into a first plane when the gate 14 is in a closed position.

Main frame 12 is a unitary one-piece element. Main frame 12 includes a first end 24 and a second end 26 interconnected by a lower horizontal support member 28. First end 24 includes an outer vertical support member 30 that confronts extension 20 and an inner vertical support member 32 that confronts the gate 14. The vertical support members 30, 32 extend upwardly and parallel to each other from the lower horizontal support member 28 and terminate at an upper horizontal support member 34. Vertical support members 30, 32 are interconnected by lower horizontal support member 28, upper horizontal support member 34, and a pair of relatively short horizontal support members 36, 38. Support member 36 is a lower support member that confronts lowermost horizontal support member 28. Support member 38 is an upper support member that confronts uppermost horizontal support member 34. Support members 28, 34, 36, and 38 run parallel to each other.

The second end 26 of the main frame 12 is a mirror image of the first end 24. Second end 26 includes an outer vertical support member 30, an inner vertical support member 32, an uppermost horizontal support member 34, a lower support member 36, and an upper support member 38.

Main frame 12 is manufactured to be a pressure frame. That is, the upwardly extending support members 30 and 32 of the second end 26 are manufactured to be slightly obtuse (slightly over 90 degrees) relative to the lower horizontal member 28. This slightly obtuse relationship permits the first end 24 and second end 26 to be relatively squeezed together between two vertically running surfaces, such as two walls, and to thereby resiliently push back against the vertically running surfaces such that the gate apparatus 10 can fix itself between two walls and in a position off the floor if desired. Latch apparatus 18 does not engage gate 14 until the second end 26 is pushed into a right angle relationship, or thereabouts, with the lowermost horizontal support member 28.

The apparatus that squeezes first end 24 and second end 26 relatively toward each other is a screw apparatus 40. Screw apparatus 40 includes a threaded shaft 42 having a disk shaped head 44 rigidly fixed on a distal end of the threaded shaft 42. Disk shaped head 44 abuts a vertical surface such as a wall. The shaft 42 is threaded and includes a knob 46 having a threaded opening that mates with the threads of the shaft 42. Knob 46 includes a face that abuts an end of one of the extensions 20, 22. Knob 46 when turned on the shaft 42 travels incrementally to and away from the head 44. The proximal end portion of shaft 42 is set in a nonthreaded hole or receptor 62 or 64 formed in one of the extensions 20, 22 or nonthreaded hole or receptor 66 or 68 formed in outer vertical support members 30 of one of the main frame ends 24, 26. If one or more of the extensions 20, 22 are not utilized, the shafts 42 are received in receptors 66, 68 formed in the outer vertical support members 30 of the main frame ends 24, 26. To squeeze the main frame ends 24, 26 relatively toward each other, knob 46 is turned or rotated to travel on shaft 42 in a direction away from disk shaped head 44.

First and second extensions 20, 22 are mirror images of each other. First extension 20 includes a pair of vertical support members 48, 50 that run parallel to each other and run the height of the outer vertical support member 30 of main frame 12. Vertical support members 48, 50 are interconnected by a lowermost horizontal support member 52, an uppermost horizontal support member 54, a lower horizontal support member 56, and an upper horizontal support member 58. Support members 52, 54, 56 and 58 run parallel to each other. Horizontal support member 56 is horizontally aligned with support member 36 of the main frame 12. Horizontal support member 58 is horizontally aligned with horizontal support member 38 of the main frame 12. First extension 20 further includes an inner vertical support member 60 running to and between the lower and upper horizontal support members 56, 58. Support member 60 runs parallel to support members 48, 50 and is disposed centrally in extension 20 and equidistance from each of support members 48, 50. Each of the vertical support members 48, 50 has a pair of openings 62, 64. Lower opening 62 is formed opposite of horizontal member 56 such that shaft 42 can extend into opening 62 and further into tubular lower horizontal member 56. Upper opening 64 is formed opposite of horizontal member 58 such that shaft 42 can extend into opening 64 and further into tubular upper horizontal member 58.

Figure 5A:
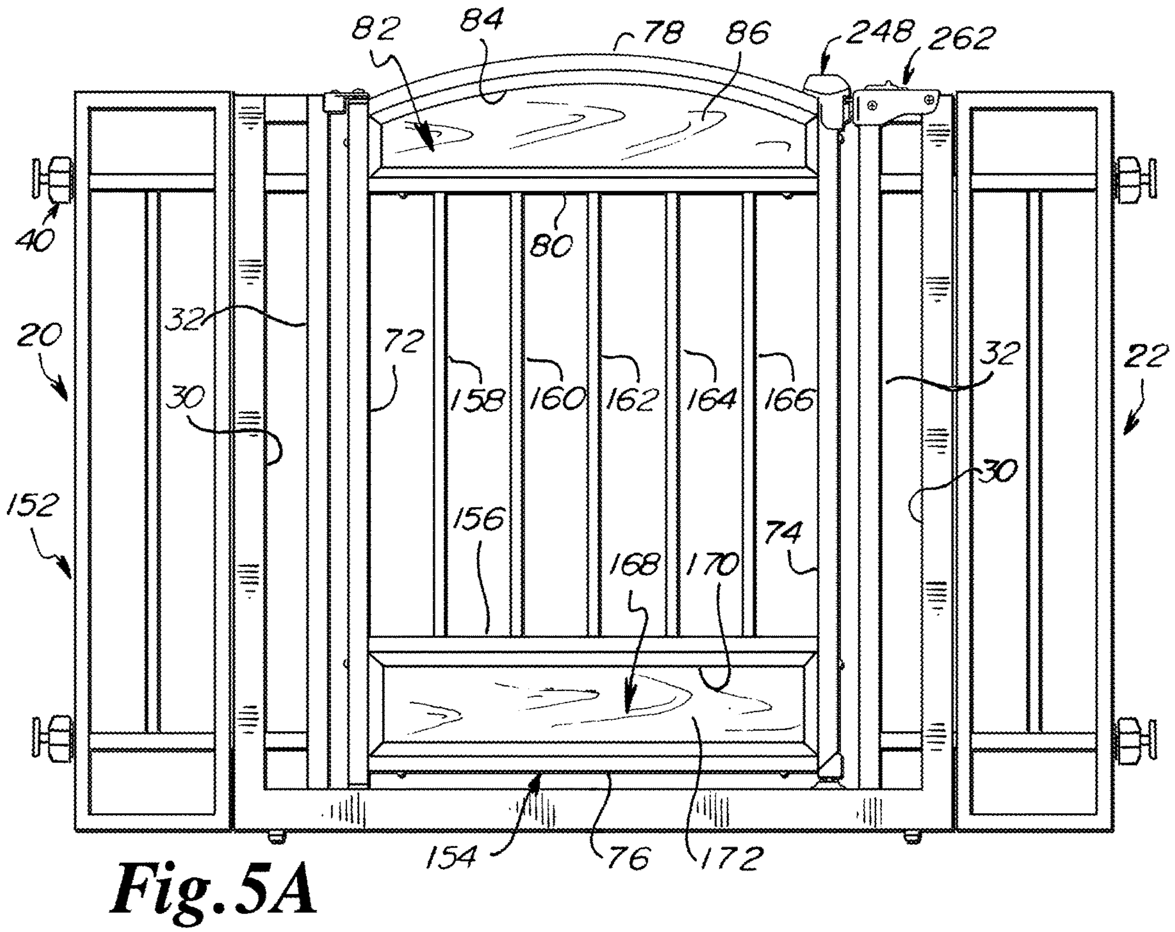
FIG. 5A is a front view of an alternate embodiment of the gate apparatus of FIG. 1.
Figure 5B:
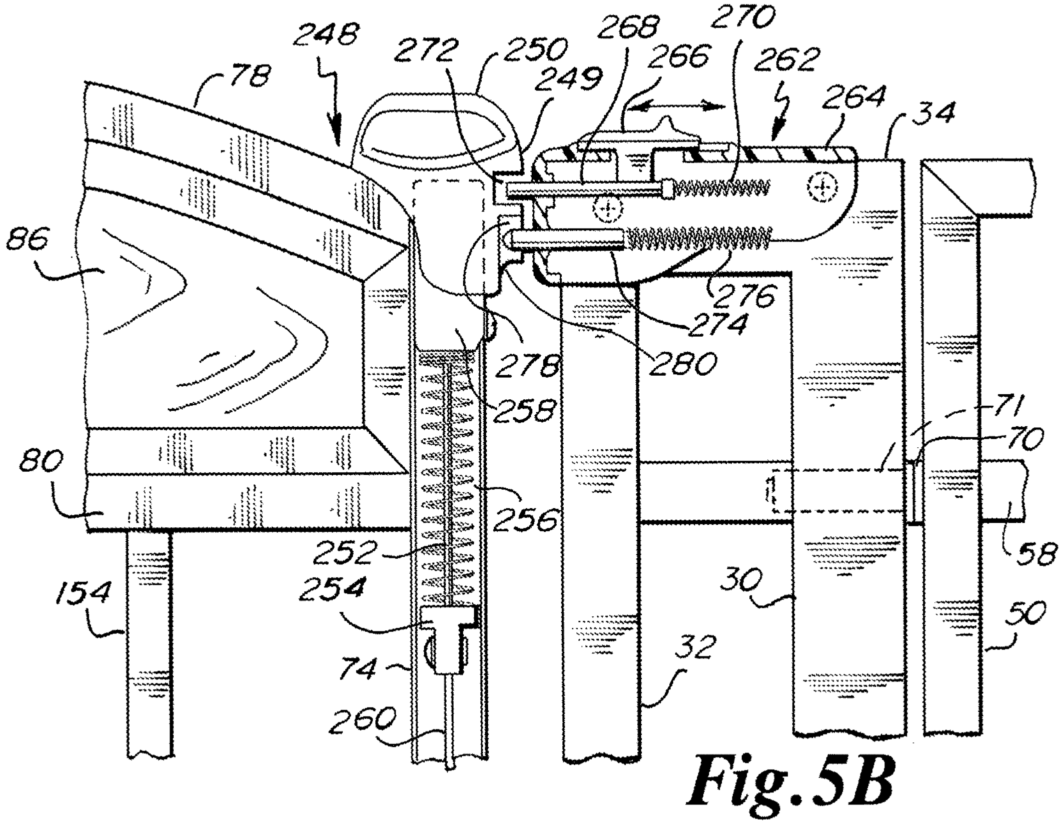
FIG. 5B is a detail, section and partially diagrammatic view of first and second latch apparatus of the gate apparatus of FIG. 5A showing the second latch apparatus in a closed state.

Extensions 20, 22 may include pin connectors 71, as shown in FIG. 5B, extending therefrom, such as from vertical support member 50. Such pin connectors 71 then engage openings 66, 68 formed in vertical support member 30. One or more spacers or washers 70 may be engaged on vertical support member 30 to space extensions 20, 22 slightly away from vertical support member 30. Spacer 70 surrounds opening 66, 68.

Gate 14 includes a first vertical support member 72, a second vertical support member 74, and a lowermost horizontal or traversing support member 76 running to and between the vertical support members 72, 74. Lowermost horizontal support member 76 is horizontally aligned with lower horizontal support member 36 of main frame 12 and horizontal support members 56 of first and second extensions 20, 22.

Gate 14 includes an uppermost or traversing support member 78 extending from an upper end of vertical support member 72 to an upper end of vertical support member 74. Uppermost or traversing support member 78 is a segment or arc of a circle and runs adjacent to panel 82 such that panel 82 includes an arc portion.

Gate 14 includes an upper horizontal or traversing support member 80 running horizontally to and between horizontal support members 72, 74. Support member 80 is generally aligned horizontally with horizontal support members 38 of main frame 12 and horizontal support members 58 of extensions 20, 22.

Running between support members 78 and 80, and further running between vertical support members 72, 74, is a panel 82. Panel 82 is opaque. More preferably, panel 82 is formed of wood or a material that provides the appearance of wood. Members 72, 74, 78, 80, the support members surrounding the panel 82, have a first thickness, i.e., a distance from a first or front face of the gate apparatus 10 to a second or rear face of the gate apparatus 10. Disposed inwardly of surrounding members 72, 74, 78 and 80, panel 82 includes a beveled periphery 84. Further inwardly of the beveled periphery 82 is a flat panel section 86 having a second thickness greater than the first thickness of members 72, 74, 78 and 80. It should be noted that beveled periphery 84 and flat panel section 86 are found on both sides of the gate 154.

Gate 14 includes inner vertical support members 88, 90, 92 and 94 running between lowermost horizontal support member 76 and upper horizontal support member 80. Support members 88, 90, 92, 94 are parallel to each other and to outer vertical support members 72, 74.

Gate 14 includes inner horizontal or traversing support member 96 running to and between vertical support members 90, 92. Inner horizontal support member 96 runs parallel to lowermost horizontal support member 76 and upper horizontal support member 80.

Gate 14 includes vertical support members 98, 100 running from inner horizontal support member 96 to upper horizontal support member 80. Vertical support members 98,

100 run parallel to each other and to vertical support members 72, 74, 88, 90, 92, and 94.

Gate 14 includes a pet door or pet gate 102. Pet door 102 is framed by lowermost horizontal support member 76, inner horizontal support member 96, inner vertical support member 90, and inner vertical support member 92. Pet door 102 includes a lowermost horizontal support member 104 and an uppermost horizontal support member 106 that run parallel to each other. Pet door includes vertical support members 108, 110, 112, and 114 running to and between lowermost horizontal support member 104 and uppermost horizontal support member 106. Pet door 102 includes a latch 116 extending between vertical support member 114 and vertical support member 92. Pet door 102 swings on a vertical axis provided by lower and upper pin connectors 118, 120. Lower pin connector 118 is disposed between lowermost support member 104 of the pet door 102 and the lowermost support member 76 of the gate 14. Lower pin connector 118 is vertically aligned with vertical support member 108. Upper pin connector 120 is disposed between uppermost horizontal support member 106 of the pet door 102 and inner horizontal support member 96 of the gate 14. Upper pin connector 120 is vertically aligned with the vertical support member 108 and with lower pin connector 118. When latch 116 is opened, pet door 102 can swing to either the front or rear face of gate apparatus 10.

Main frame 12 includes a piece 122 extending from a junction of uppermost horizontal support member 34 and vertical support member 32 to a space slightly above vertical support member 72, where a distal end of piece 122 mounts a pin connector at pivot connection B for swingably mounting the gate 14.

A washer or spacer or other piece may be engaged about the pin connector and between the distal end of piece 122 and the upper end of vertical support member 72. Such pin connector extends into vertical support member 72. A decorative cover 124 extends over piece 122, partially about horizontal support member 34 and partially about vertical support member 32. Gate 14 is swingably mounted on a mount 126 engaged on lowermost horizontal support member 28 of main frame 12. A distal end portion of mount 126 confronts vertical support member 32 of end 24 of frame 12. A proximal end portion of mount 126 is fixed to a lower end of vertical support member 72. The connection between the distal end portion of mount 126 and horizontal support member 28 is pivot connection C. Axis A extends between pivot connections B and C. Axis A is oblique relative to horizontal and vertical frame members of the barrier frame 12 and the gate 14. Oblique means: 1) neither perpendicular nor parallel to a given line or surface, 2) slanting, and 3) sloping.

Figure 2A:
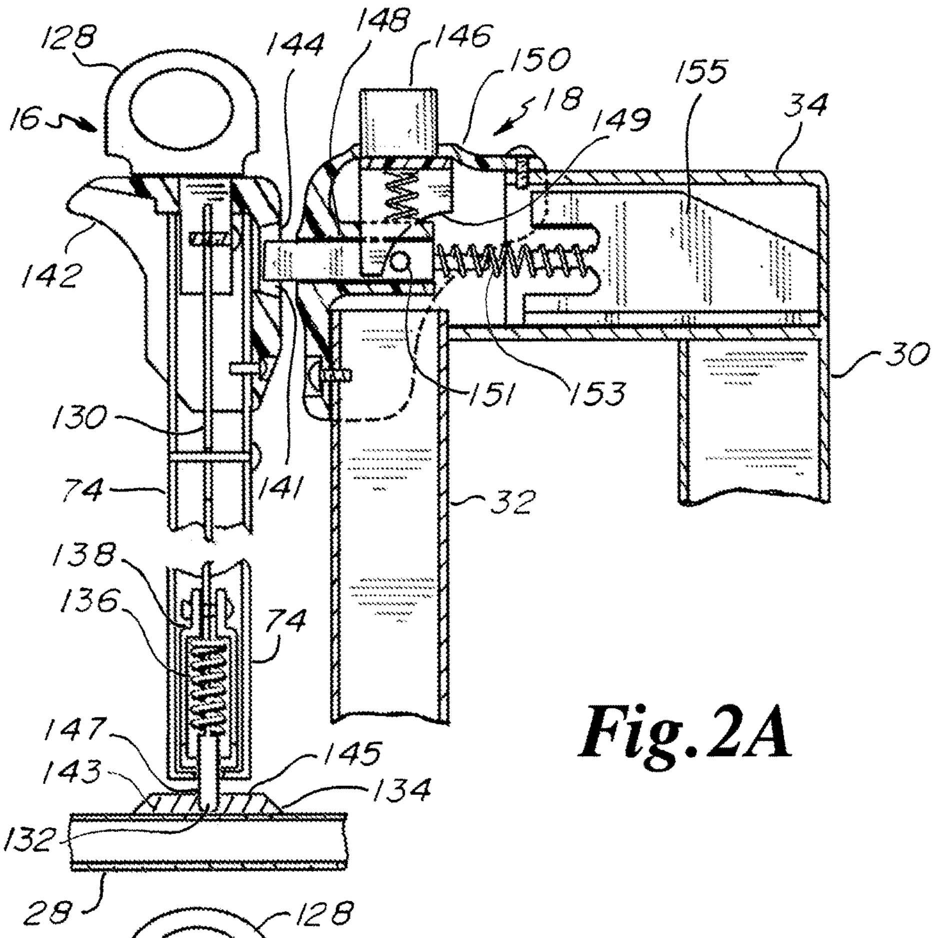
FIG. 2A is a detail, section and partially diagrammatic view of first and second latch apparatus of the gate apparatus of FIG. 1 and shows the first and second latch apparatus in a closed state.

As shown in FIG. 2A, the first latch apparatus 16 includes a finger handle 128. Finger handle 128 is engaged to an upper end of a vertical running elongate piece or rod 130. A first or lower latch 132 is engaged to a lower end of the vertical running elongate piece 130. Latch 132 interacts with a latch receiver 134 extending upwardly from the upper face of lowermost support member 28 of main frame 12. A coil spring 136 is engaged about the vertical running elongate piece 130. An upper end of the coil spring 136 abuts a stationary piece 138 fixed in vertical support member 74. A lower end of the coil spring 136 is engaged to the upper end of latch 132. When the finger handle 128 is snared and pulled up by a finger, the coil spring 128 is compressed. When the finger handle 128 is released, the coil spring 128 pushes latch 132 and elongate piece 130 downwardly such that latch 132 may engage latch receiver 134. Latch receiver 142 includes ramps 143 that the distal end of latch 132 hits when the gate 14 is closed. When the distal end of latch 132 hits ramp 143, the latch 132 is forced upwardly and inwardly, whereupon the distal end of latch 132 rides on the horizontal upper surface 145 until the coil spring 136 forces the distal end of the latch 132 downwardly into a central opening 147 formed in the latch receiver 142 so as to lock the first latch apparatus 16. Ramp 143 lies parallel to horizontal member 28. Ramp 143 is oblique relative to a flat upper surface or horizontal member 28. Latch receiver 142 of first latch apparatus 16 is an upper molding or piece or housing 142 extending about the junction of support member 78 and vertical support member 74. Latch receiver or upper molding or housing 142 includes a recess or latch opening 144 for an upper latch 148 of the second latch apparatus 18 and further includes ramps or inclined surfaces 141 leading into the recess 144. A top wall, a bottom wall, and a pair of sidewalls within the molding 142 form the latch opening 144 for upper latch 148.

The second latch apparatus 18 includes a button 146 mounted in a housing 150 at the junction of uppermost horizontal support member 34 and vertical support member 32 of second end 26. Button 146 is operatively connected to the upper latch 148 that is also mounted in the housing 150 of uppermost horizontal support member 34 and vertical support member 32 of second end 26. A distal end of latch 148 is received in recess 144 of latch receiver or upper molding or housing 142. Latch 148 is operatively connected to button 146 such that when button 146 is pushed down, latch 148 is drawn out of recess 144 such that gate 14 can be swung open. This action is provided for by an inner curved end or edge 149 of button member 146. When pushed downwardly, curved edge 149 draws the latch 148 inwardly by a tab 151 on a proximal end of the latch 148. Tab 151 rides on the curved edge 149. A spring 153 mounted in the housing 150 of uppermost horizontal support member 34 and vertical support member 32 of second end 26 biases the latch 148 in the closed position, i.e., in the position where the distal end of the latch 148 is in recess 144. One end of spring 153 is engaged to a proximal end of the latch 148. The other end of the coil spring 153 is engaged to a fixed piece 155 fixed in vertical support member 34.

First and second latch apparatus 16 and 18 are dependent upon each other when the gate 14 is being opened. In other words, for the gate 14 to be opened, each of the first and second latch apparatus 16, 18 must be operated. If button 146 is pressed down to draw in the upper latch 148 and the user attempts to push or pull open the gate 14 without raising the finger handle 128, the lower latch 132 remains in the down position in latch receiver 134 and the gate 14 cannot be pushed or pulled open. If the finger handle 128 is raised to draw up the lower latch 132 and the user attempts to push or pull open the gate 14 without pressing down on the button 146, the upper latch 148 remains in the upper latch receiver 142 and the gate 14 cannot be pushed or pulled open. Only when each of the finger handle 128 and button 146 is operated can the gate 14 be pushed or pulled open. That is, only when the finger handle 128 is in the raised position and the button 146 is pressed down can the gate 14 be pushed or pulled open.

First and second latch 16 and 18 are independent of each other for a closing of the gate 14. In other words, gate 14 requires only one of the lower and upper latches 132, 148 to be engaged in its respective latch receiver 134, 142 for the gate 14 to be locked in its closed position where the gate 14 is in a common plane with barrier frame 12. Gate 14 closes to a locked position automatically without operation of the finger handle 128 or button 146 because, when gate 14 is being closed from either face of the barrier frame 12, lower and upper latches 132, 148 engage respective ramps 143, 141 that lead into respective latch openings 147, 144 such that there is a snapping action provided by respective coil springs 136, 153 when latches 132, 148 engage latch openings 147, 144.

It is preferred that all support members of gate apparatus 10 are tubular, except piece 122 and mount 126 may not be tubular.

It is preferred that all support members of gate apparatus 10 are square or rectangular in section. These support members include support members 28, 30, 32, 34, 36, 38, 48, 50, 52, 54, 56, 58, 60, 72, 74, 78, 80, 88, 90, 92, 94, 96, 98, 100, 104, 106, 108, 110, 112, and 114. A rectangle is a parallelogram having four right angles. A square is a rectangle having four sides of equal length.

The provision of panel 82 in the gate 14 makes the gate 14 stand out in the gate apparatus 10. A user in a hurry, or a visitor to the home, more readily can determine where the gate 14 is in the overall gate apparatus 10. A conventional gate includes a great number of wires such that it may be difficult to quickly ascertain where the fixed portions of the barrier end and where the gate picks up.

The present gate apparatus 10 is a combination panel and tube gate apparatus where the tubes of the gate are rectangular in section and where the panels are wood or a wood composite or have the appearance of wood. Tubes that are rectangular in section tend to appear less utilitarian and more aesthetic than tubes that are round in section. Wood panels or panels that have the appearance of wood are more pleasing to the eye than metal panels or metal gates that have no panels, especially in a residence where a great amount of wood may be found.

FIG. 5A shows a gate apparatus 152 that does not have a pet door 102. Gate apparatus 152 includes a gate 154. Gate 154 includes the lowermost horizontal support member 76, the traversing horizontal support member 78, the vertical support member 72 defining a swing axis, and vertical support member 74. Gate 154 includes upper horizontal support member 80, panel 82, beveled periphery 84, and flat panel portion 86. If desired, gate apparatus 152 can include piece 122 and mount 126 to provide pivot connections B and C and oblique axis A.

Gate 154 includes lower intermediate horizontal support member 156 running to and between vertical support members 72, 74. Horizontal support member 156 is disposed between and runs parallel to horizontal support members 76, 80.

Gate 154 further includes vertical support members 158, 160, 162, 164, and 166. Members 158, 160, 162, 164 and 166 run parallel to each other and to vertical support members 72, 74.

Running between horizontal support members 76 and 156, and further running between vertical support members 72, 74, is a panel 168. Panel 168 is opaque. More preferably, panel 168 is formed of wood or a material that provides the appearance of wood. Members 72, 74, 76, and 156, the support members surrounding the panel 168, have a first thickness, i.e., a distance from a first or front face of the gate apparatus 152 to a second or rear face of the gate apparatus 152. Inwardly of surrounding members 72, 74, 76 and 156, panel 168 includes a beveled periphery 170. Inwardly of the beveled periphery 170 is a flat panel section 172 having a second thickness greater than the first thickness of members 72, 74, 76, and 156. It should be noted that beveled periphery 170 and flat panel section 172 is found on both sides of the gate 154.

In gate apparatus 152, upper panel 82 and lower panel 168 have the same length, i.e., are set between the same vertical support members 72, 74. Such a common length makes the gate 154 visually stand out for the user.

It should be noted that gate apparatus 10 and gate apparatus 152 minimize the number of horizontal or traversing support members. One reason for this is to maximize the difficulty for children and pets to climb up and over the gate apparatus 10, 152.

Gate 14 is swingable on an axis A. Axis A runs through a first pivot connection B and a second pivot connection C. A true vertical line running through pivot connection B is spaced apart from and runs parallel to a true vertical line running through pivot connection C. Neither of such true vertical lines are parallel with axis A.

When gate apparatus 10 is set up between two vertical surfaces, such as walls, the horizontal and vertical support members of the gate apparatus 10 are likely not truly vertical and truly horizontal, but merely generally vertical and generally horizontal.

If axis A hypothetically ran horizontally, and if gate 14 depended from pivot connections set apart horizontally from each other, where such pivot connections established such hypothetical axis, gate 14 when released from an open position would swing like a pendulum and eventually come to rest in a true vertical plane and in a common plane with the barrier frame 12. This principle is applied to this case where axis A is not horizontal, but is partially horizontal. In effect, axis A is partially horizontal and partially vertical (or has both horizontal and vertical components) because axis A is oblique relative to vertical support members of the barrier frame 12 and gate 14 and is further oblique relative to horizontal support members of the barrier frame 12 and gate 14.

Figure 3A:
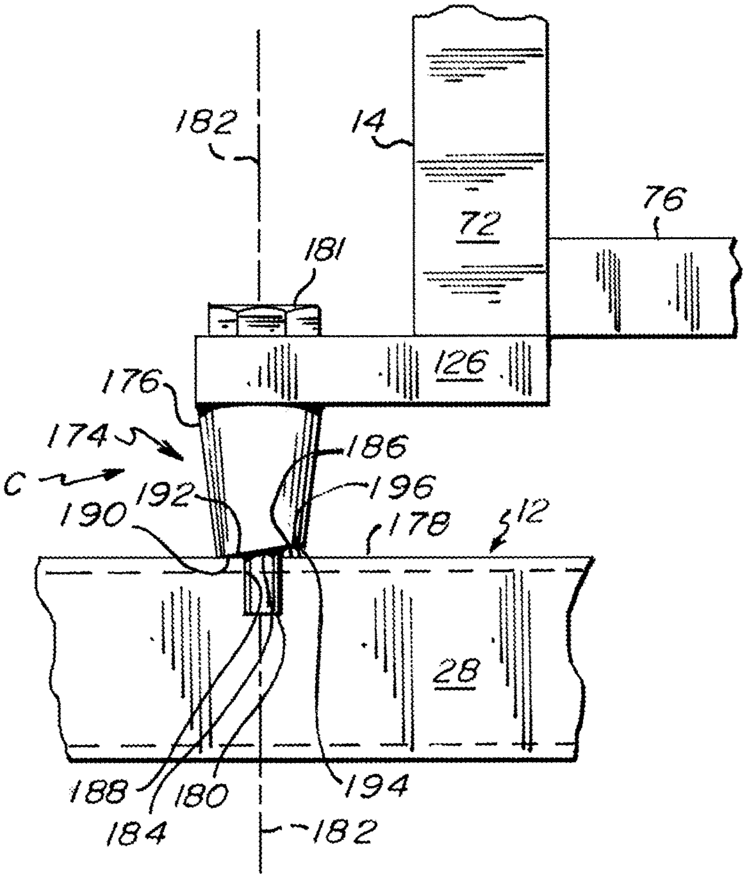
FIG. 3A is a detail view of a lower pivot connection between a gate and a barrier frame of the gate apparatus of FIG. 1 prior to the faces of the pivot connection riding upon each other.
Figure 3B:
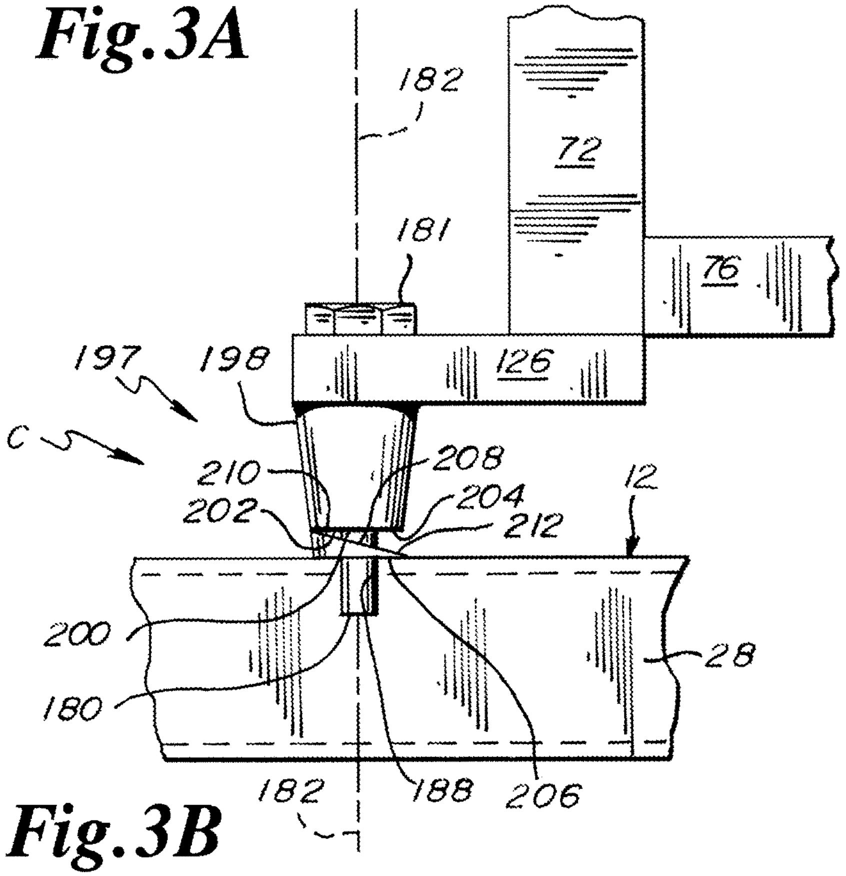
FIG. 3B is a detail view of an alternate lower pivot connection between a gate and a barrier frame of the gate apparatus of FIG. 1 prior to the faces of the pivot connection riding upon each other.
Figure 4A:
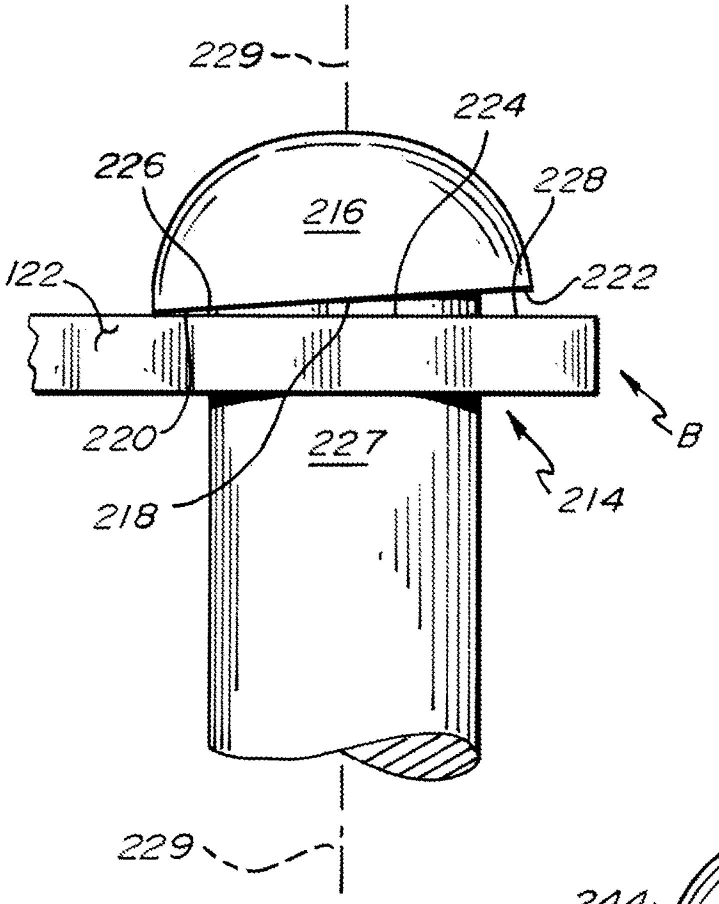
FIG. 4A is a detail view of an alternate upper pivot connection between a gate and a barrier frame of the gate apparatus of FIG. 1 prior to the faces of the pivot connection riding upon each other.
Figure 4B:
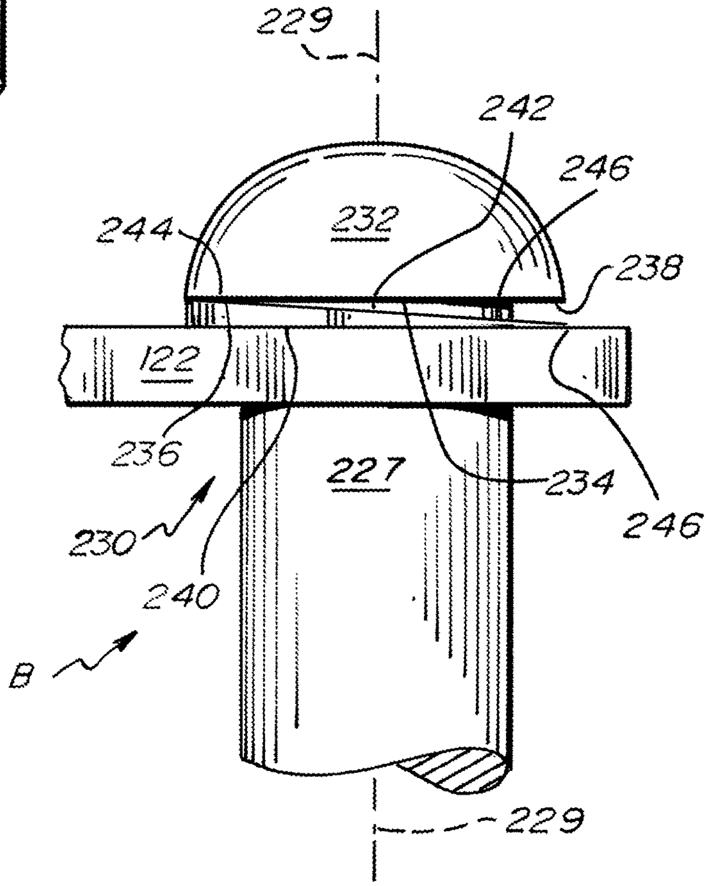
FIG. 4B is a detail view of an alternate upper pivot connection between a gate and a barrier frame of the gate apparatus of FIG. 1 prior to the faces of the pivot connection riding upon each other.

Examples of first pivot connection B are pivot connections 214 and 230 that are shown in FIGS. 4A and 4B. Examples of second pivot connection C are pivot connections 174 and 197, shown in FIGS. 3A and 3B.

As shown in FIG. 3A, gate apparatus 10 includes a second pivot connection or hinge 174. Pivot connection 174 includes a spacer or portion 176 fixed relative to the gate 14. Pivot connection 174 further includes a portion 178 fixed relative to the frame 12. This portion 178 is a planar upper surface section of horizontal support member 28. Frame 12 lies generally in a plane. Gate 14 lies generally in a plane. When the gate 14 is closed, gate 14 and frame 12 lie generally in the same plane.

Spacer or gate portion 176 is fixed relative to piece 126, which in turn is fixed relative to vertical support member 72 and horizontal support member 76. Piece 126 includes a proximal end engaged to vertical support member 72. A distal end of piece 126 is engaged to spacer or gate portion 176. Pivot pin 180 extends through spacer or gate portion 176 and is nonrotatably fixed thereto. Pin 180 includes a pin head 181. Gate portion or spacer 176 includes the pivot pin 180. Pivot pin 180 is nonrotatably fixed relative to gate portion or spacer 176 and thereby also fixed relative to piece 126, vertical support member 72 and horizontal support member 76 of gate 14. Thus, pivot pin 180 is fixed relative to gate 14. Pivot pin 180 includes an axis 182. When pivot pin 180 is set in hole 188, axis 182 may become aligned with, or closely aligned with, axis A because face 184 of spacer 176 is oblique relative to the horizontal or is oblique relative to an axis of the vertical support member 32 of the first end 24 of the barrier frame 12.

Spacer 176 includes the first face 184. First face 184 is disk shaped. First face 184 lies at a right angle to the plane in which the gate 14 lies. First face 184 is disposed obliquely relative to the pin axis 182 and obliquely relative to the horizontal support members of the gate 14.

First face 184 is preferably not at a right angle to the pin axis 182. First face 184 is preferably between 85 and 89.9 degrees to axis 182, more preferably between 86 and 89.9 degrees to axis 182, still more preferably between 87 and 89.9 degrees to axis 182, and yet more preferably between 88 and 89.9 degrees to axis 182 such that face section 184 slopes upwardly from the pivot side of the gate 14 to the latch side of the gate 14 when the pivot pin 180 is oriented truly vertical.

Figure 2B:
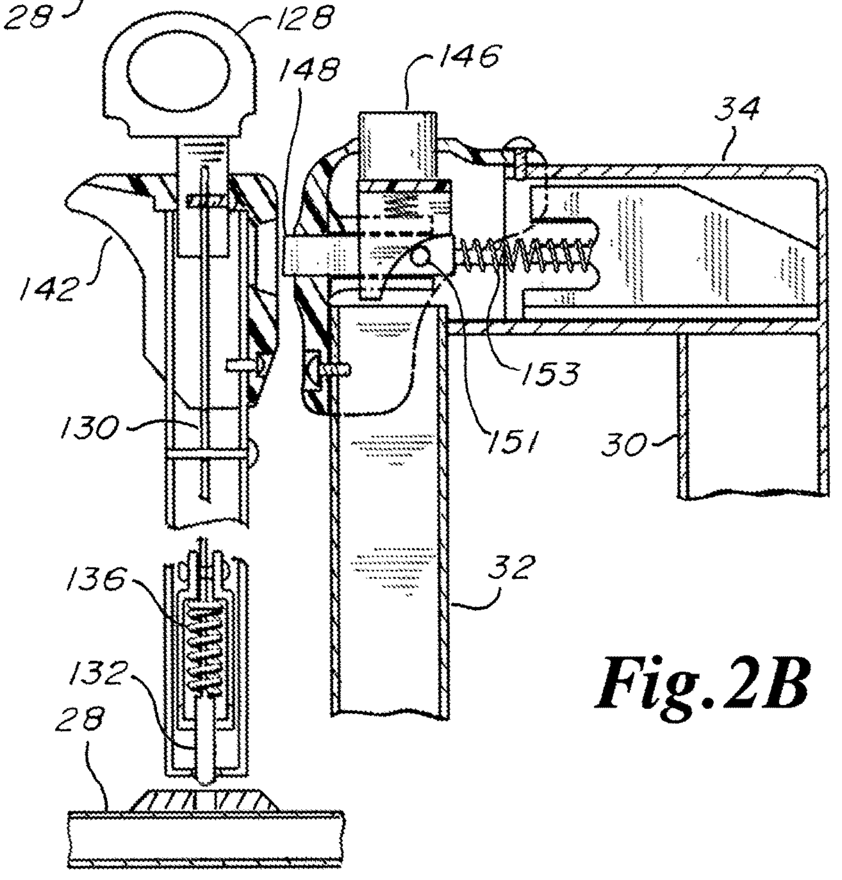
FIG. 2B is a detail, section and partially diagrammatic view of first and second latch apparatus of the gate apparatus of FIG. 1 and shows the first and second latch apparatus in an open state.

It should be noted that the following angles as illustrated are exaggerated: 1) the oblique angle of face 184 relative to the other end of the spacer 176 or relative to horizontal components of the gate 14 in FIG. 3A, 2) the oblique angle of face 208 relative to the upper surface of member 28 and other horizontal components of the frame 12 in FIG. 3B, 3) the oblique angle of face 218 relative to pivot pin axis 229 in FIG. 4A, and 4) the oblique angle of face 242 relative to piece 122 and other horizontal components of barrier frame 12 of FIG. 4B.

Frame portion 178, i.e., the upper face of horizontal support member 28 of barrier frame 12, that is fixed relative to the frame 12 includes a second face 186. Frame portion 178 includes a pivot receptor or seat 188 for the pivot pin 180. The thickness (or height) of seat 188 is relatively small such that pivot pin 180 can tilt or demonstrate some play in seat 188. Face 186 is disposed at a right angle to the plane in which the frame 12 lies. Seat 188 includes a depth greater than the axial length of pivot pin 180 such that, when pivot pin 180 is seated in the seat 188, the distal end of the pivot pin 180 is spaced from the bottom of the seat 188 (from the floor of member 28) such that a face section 190 of gate portion or spacer 176 makes contact with a face section 192 of frame portion 178. Seat 188 in effect is bottomless because seat 188 is a hole that extends into tubular member 28. A pivot side end portion 190 lies on the swing or pivot side, as opposed to the latch side, of gate portion or spacer 176 of gate 14. Also, a pivot side end portion 192 lies on the swing or pivot side, as opposed to the latch side, of face 186 of upper surface 178 of horizontal member 28 of frame 12.

Generally, by virtue of one or more of axis A and the oblique face 184, gate 14 will, after being opened and released by the user, swing under the influence of gravity back toward the plane in which the frame 12 lies and come to rest against the frame 12 or come to rest in frame 12, where latches 132 and 148 snap into their respective openings 147 and 144. More specifically, the gate 14 returns to a position close to the plane of the barrier frame 12 or returns to a closed position under the influence of gravity because of one or more of the following factors: a) at least one of the pivot connections B and C establish an axis (oblique axis A) that is partially horizontal (has a horizontal component and a vertical component), b) the oblique face 184, c) at least one of the pivot connections B and C tends to be imperfect and/or have a slight degree of play, d) the distal end of the pivot pin 180 extends into a space and does not ride upon on a surface thereby permitting pivot pin 180 to tilt, and e) faces 184 and 186 that ride on each other or a latch side face section 194 of oblique face 184 that will tend to collapse or seek out a latch side face section 196 of face 186 of frame portion 178.

In other words, a gate 14 having a perfectly vertical axis at pivot connection B and a perfectly vertical axis at pivot connection C would not swing because such parallel axis are spaced apart from each other. Only if one pivot connection was provided with an arc through which to move would such a gate 14 swing. However, with slightly oblique face 184, the axis 182 of pivot pin 180 is titled and drawn closer to, if not in alignment with, axis A.

Upper pivot connection B, by virtue of piece 122, is spaced a first distance from a vertical axis of vertical support member 32 of barrier frame 12. Lower pivot connection C, by virtue of piece 126, is spaced a second distance from the vertical axis of vertical support member 32 of barrier frame 12, with such second distance being less than such first distance, such that axis A takes on a horizontal component, such that gate 14 swings shut automatically under the influence of gravity without the aid of a spring.

It should be noted that, for purposes of illustration only, pivot pin 180 of FIGS. 3A and 3B and pivot pin 227 of FIGS. 4A and 4B are shown oriented vertically prior to being tilted. In other words, for purposes of illustration only, the following pairs of confronting faces are shown with their latch side end portions spaced apart: faces 184 and 186 of FIG. 3A, faces 200 and 208 of FIG. 3B, faces 218 and 224 of FIG. 4A, and faces 234 and 242 of FIG. 4B. In operation, such pairs of faces abut and make contact with each other and ride upon each other.

Gate apparatus 10 includes barrier frame 12 in generally a first plane. Barrier frame has a first vertical support member 32 on first end 24. First vertical support member 32 includes a first vertical axis. Gate 14 is swingable into and out of the barrier frame 12 and into and out of the first plane. Gate 14 includes a pivot side and a latch side. A first pivot connection B is disposed between the gate 14 and the barrier frame 12. A second pivot connection C is disposed between the gate 14 and the barrier frame 12. The first and second pivot connections B, C establish a swing axis A on which the gate 14 swings. Swing axis A is oblique relative to the first vertical axis of the first vertical support member 32 of end 24 such that the swing axis A has a horizontal component (i.e., is oriented between the vertical and the horizontal) whereby, after the gate 14 has been opened and released, the gate 14 swings back to the first plane of the barrier frame 12 under the influence of gravity.

The barrier frame 12 further includes an upper horizontal frame member 122 extending from the first vertical member 32 of end 24 at a right angle. The first pivot connection B is engaged to the upper horizontal frame member 122 at a first distance from the first vertical axis of the first vertical member 32 of end 24. The barrier frame 12 further includes a lower horizontal frame member 28 extending from the first vertical member 32 of end 24 at a right angle. The second pivot connection C is engaged to the lower horizontal frame member 28 at a second distance from the first vertical axis of the first vertical member 32 of end 24, where such first distance is greater than such second distance.

Pivot connection 174 of FIG. 3A includes a first face 184 and a second face 186. The first and second faces 184, 186 confront each other. The first face 184 is fixed relative to the gate 14. The second face 186 is fixed relative to the horizontal frame member 28 of frame 12. Pivot connection 174 of FIG. 3A further includes a pivot pin 180. Pivot pin 180 extends through the first and second faces 184, 186. Pivot pin 180 includes an axis 182. First face 184 is oblique relative to axis 181 (and is further oblique relative to horizontal member 76 of gate 14) such that, when the first and second faces 184, 186 make contact with each other, the axis 182 of the pivot pin 180 becomes generally aligned with swing axis A.

Gate 14 includes upright support member 72. Upright support member 72 includes an upright axis. Upright support member 72 includes an upper end and a lower end. First pivot connection B is engaged to the upper end of upright support member 72. Second pivot connection C is offset from the lower end of upright support member 72 of gate 14. Second pivot connection C is disposed between the first vertical axis of first vertical member 32 of end 24 and the upright axis of upright support member 72 of gate 14. Piece 126 includes a proximal end and a distal end. The proximal end of piece 126 is engaged to the lower end of upright support member 72. Piece 126 extends from the lower end of the upright support member 72 at a right angle. The second pivot connection C is engaged between the distal end of piece 126 and the horizontal support member 28 of barrier frame 12.

It should be noted that the automatic return under the influence of gravity function of the gate 14 described with reference to FIG. 3A is provided by the structures of FIGS. 3B, 4A and 4B.

The pivot connection 197 of FIG. 3B includes a spacer or gate portion 198 fixed relative to the gate 14. Spacer or gate portion 198 includes a first face 200 fixed relative to the gate 14. First face 200 includes a pivot side end portion 202 and a latch side end portion 204.

Pivot connection 197 further includes a portion 206 fixed relative to the frame 12. Frame portion 206 is triangular in section and includes a second face 208. Face 208 includes a pivot side end portion 210 and a latch side end portion 212.

Face 200 is disposed at a right angle relative to the plane of the gate 14. Face 200 is disposed at a right angle relative to the axis 182 of pivot pin 180.

Face 208 is disposed at a right angle relative to the plane of the frame 12. Face 208 is disposed obliquely relative to horizontal support member 76, and obliquely relative to the vertical axis of first vertical support member 32 of end 24 of frame 12.

The pivot connection 214 of FIG. 4A includes a gate portion or pivot pin head 216 fixed relative to the gate 14. Gate portion 216 includes a first face 218 fixed relative to the gate 14. First face 218 includes a pivot side end portion 220 and a latch side end portion 222.

Pivot connection 214 further includes a piece or portion 122 fixed relative to the frame 12. Frame portion 122 includes a second face 224. Face 224 includes a pivot side end portion 226 and a latch side end portion 228.

Face 218 is disposed at a right angle relative to the plane of the gate 14. Face 218 is disposed at an oblique angle relative to an axis 229 of pivot pin shaft 227. Pivot pin shaft 227 is fixed to gate portion or pivot pin head 216.

Face 224 is disposed at a right angle relative to the plane of the frame 12. Face 224 is shown disposed at a right angle relative to the axis 229 of pivot pin shaft 227 prior to the pivot pin shaft 227 being tilted by the connection of the gate 14 to the barrier frame 12.

The pivot connection 230 of FIG. 4B includes a portion or pivot pin head 232 fixed relative to the gate 14. Gate portion or pivot pin head 232 includes a first face 234 fixed relative to the gate 14. First face 234 includes a pivot side end portion 236 and a latch side end portion 238.

Pivot connection 230 further includes a portion 240 fixed relative to the frame 12. Frame portion 240 is triangular in section and includes a second face 242. Face 242 includes a pivot side end portion 244 and a latch side end portion 246.

Face 234 is disposed at a right angle relative to the plane of the gate 14. Face 234 is disposed at a right angle relative to the axis 229 of pivot pin shaft 227.

Face 242 is disposed at a right angle relative to the plane of the frame 12. Pivot pin shaft 227 is fixed to gate portion or pivot pin head 232. Face 242 is disposed obliquely relative to the vertical axis of first vertical support member 32 of end 24 of frame 12, and relative to horizontal support member or piece 122.

It should be noted that gate portions 216, 232 are pivot pin heads fixed relative to the gate 14 and have associated pivot pin shafts 227. That is, when the gate 14 swings, pivot pin heads or gate portions 216, 232 and the pivot pin shafts 227 swing with the gate 14.

Pivot pin head 216 has an undersurface that is oblique relative to axis 229. This undersurface is face 218.

Each of the pivot pin shafts 227 shown in FIGS. 4A and 4B enters an opening formed in piece 122, exits such opening, and then enters the upper end of upright support member 72. Upright support member 72, includes its upper end, is tubular. Each of pivot pin shafts 227, tilted by the oblique faces 218 and 242, remains tilted and hidden from view in tubular upright support member 72. Tilted pivot pins 180 also are hidden from view in tubular member 28.

Frame piece or portion 122 is a receiver or seat for the pivot pin head or gate portion 216. Portion 240, fixed to frame portion 122, is a receiver or seat for pivot pin head 232.

It should be noted that only one of pivot connections 174, 197, 214, 230 is required for the automatic swing return of gate 14. However, if desired, any of the lower pivot connections 174, 197 may be used in combination with any of the upper pivot connections 214, 230. Preferred is a combination where pivot connection 174 is utilized along with an upper pivot pin connection where a pivot pin that swings independently of each of the frame 12 and gate 14 is used, where such pivot pin has no undersurface that is oblique, and where piece 122 has no piece or seat having an oblique surface.

In the pivot connections 174, 197, 214, and 230 of FIGS. 3A, 3B, 4A and 4B, the pivot side end portion of a face is diametrically opposite of the latch side end portion of such face.

In the pivot connections 174, 197, 214, and 230 of FIGS. 3A, 3B, 4A and 4B, when the frame 12 and gate 14 are coplanar, i.e., when the gate 14 is closed, the pivot side end portions of the confronting upper and lower faces make contact with each other and the latch side end portions of the confronting upper and lower faces make contact with each other.

In the pivot connections 174, 197, 214, and 230 of FIGS. 3A, 3B, 4A and 4B, faces 184 and 218 run upwardly from their pivot side end portions 190, 220 to their latch side end portions 194, 222 when the pivot pin axis is at a true vertical position.

In the pivot connections 174, 197, 214, and 230 of FIGS. 3A, 3B, 4A and 4B, faces 208, 242 run downwardly from their pivot side end portions 210, 244 to their latch side end portions 212, 246 when the pivot pin axis is at a true vertical position.

FIGS. 5A and 5B shows a first latch apparatus 248. Latch apparatus 248 includes a molding or latch receiver or housing 249. Mounted on and integral with housing 249 is a finger handle 250 that is engaged to a rod 252 that in turn is engaged to a piston 254 slideable in tubular support member 74. By way of contrast, it should be noted that molding or latch receiver 142 of first latch apparatus 16 is fixed to gate 14 and finger handle 128 is raised independently of molding or first latch receiver 142.

Piston 254 of first latch apparatus 248 compresses a coil spring 256 in member 74 against a stationary piece 258 engaged in member 74. When finger handle 250 is released from a drawn up position, coil spring 256 pushes piston 254 downwardly. Piston 254 is engaged to a rod 260 that is engaged to a lower latch, such as lower latch 132 of first latch apparatus 16.

FIG. 5B further shows a second latch apparatus 262. Second latch apparatus 262 includes a housing 264 mounted on a junction of support members 32, 34. A finger slide 266 is mounted on the housing 264 and extends through an opening in the housing 264 to be engaged to a first latch or extension 268. First latch 268 is biased by a coil spring 270 fixed in the housing 264 such that a distal end of latch 268 normally extends out of the housing 264. Distal end of latch 268 engages an opening 272 formed in latch receiver or molding 249. Opening 272 is an opening that extends laterally through housing 249, i.e., from one face or side of the gate 154 to the other face or side of the gate 154. Opening 272 is formed by top and bottom walls and an end wall but includes no sidewalls. Second latch apparatus 262 further includes a second latch 274 mounted in housing 264. A distal end of latch 274 normally extends out of housing 264 under the bias of a coil spring 276 fixed in housing 264. The distal end of latch 274 engages an opening 278 formed in molded latch receiver 249 below and spaced apart from opening 272. Opening 278 is formed longitudinally in molding 249 but also is bottomless to allow the molding 249 and its finger handle 250 to be raised. Opening 278 is formed by sidewalls, a top wall and an end wall. The structure that forms opening 278 includes no bottom wall at opening 278. Molding 249 includes a pair of ramps 280 leading into the opening 278 such that, when the gate 14 is closed, one of the ramps 280 hits the distal end of latch 274 and pushes the latch 274 inwardly into the housing 264 whereupon, after the distal end of latch 274 travels the length of the ramp 280, the latch 274 snaps into longitudinal opening 278.

First and second latch apparatus 248, 262 operate differently from the first and second latch apparatus 16, 18. That is, the first and second latch apparatus 248, 262 must be operated in sequence in order to open gate 154, with the sequence being a first in time operation of the second latch apparatus 262 to draw in latch 268 and a second in time operation of the first latch apparatus 248 to raise the finger handle 250 and the lower latch connected to rod 260. If a user attempts to raise finger handle 250, but does not slide finger slide 266 to the open position, latch 268 will prevent the finger handle 250 from being raised. If the finger slide 266 is slid to draw in the distal end of the latch 268 and out of opening 272, then the finger handle 250 may be raised and the lower latch may be disengaged from its latch receiver (as shown in FIGS. 2A and 2B). Gate 154 may be automatically closed because the lateral through opening 272 swings over the distal end of the latch 268, because one of the ramps 280 push the second latch 274 inwardly, and because one of the ramps 143 of lower latch apparatus 16 pushes in lower latch 132 (please see FIGS. 2A and 2B). To open gate 154, latch 262 is operated and, while slide 266 is holding the distal end of latch 268 out of opening 272, latch 248 is operated, whereupon gate 154 may be swung open to either face of frame 12.

In operation, to set up the gate apparatus 10, a location between two vertical surfaces is selected. Then, if required, one or more of the extensions 20, 22 are engaged to the ends 24, 26 of the barrier frame 12. Then, screw apparatus 40 are operated to squeeze the ends 24, 26 of the barrier frame 12 relatively toward each other until inner vertical support member 32 of the second end 26 of the barrier frame 12 is substantially parallel with vertical support member 74 of the gate 14 such that upper latch 148 is engagable with upper latch receiver 142.

In operation, to open the gate 14 from the closed position where gate 14 is in a common plane with barrier frame 12, the user raises the finger handle 128, presses down on button 146, and pushes or pulls on the gate 14 to swing the gate 14 open to either face of the barrier frame 12. It should be noted that raising the finger handle 129 and pressing down on button 146 are steps that are independent of each other (in contrast to the sequential steps required for first and second latch apparatus 248, 262). Then the user 14 walks over the relatively low horizontal support member 28 and through the opening in the barrier frame 12 left by the open gate 14.

In operation, to close the gate 14 after walking through the opening in the barrier frame left by the open gate 14, the user may push the gate 14 closed and the upper and lower latches 148, 132 will automatically snap into their respective upper and lower latch receivers 142, 134. If the user does not take a positive action, such as a push against the gate 14, the gate 14 will return to a position close to the closed position by virtue of one of the springless automatic return pivot connections 174, 197, 214, and 230 of FIGS. 3A, 3B, 4A and 4B. Close to the closed position means that the distal ends of upper and lower latches 148, 132 may come to rest upon the respective ramps 141, 143 of the respective latch receivers 142, 134 or that gate 14 will swing back to a slightly ajar position. In such slightly ajar position, the relatively heavy metal gate 14 may not be able to be swung or pushed or pulled open by a small child or pet, thereby effectively acting as a barrier even though the upper and lower latch apparatus 16, 18 have not been engaged. In some cases, depending upon the exact x, y, and z orientation of the gate apparatus 10, gate 14 will swing all of the way into the closed position with latches 132, 148 snapping into their respective latch receivers 134, 142 by virtue of the springless automatic return pivot connection 174, 197, 214 or 230 without a user actively pushing or pulling on the gate 14.

Figure 6A:
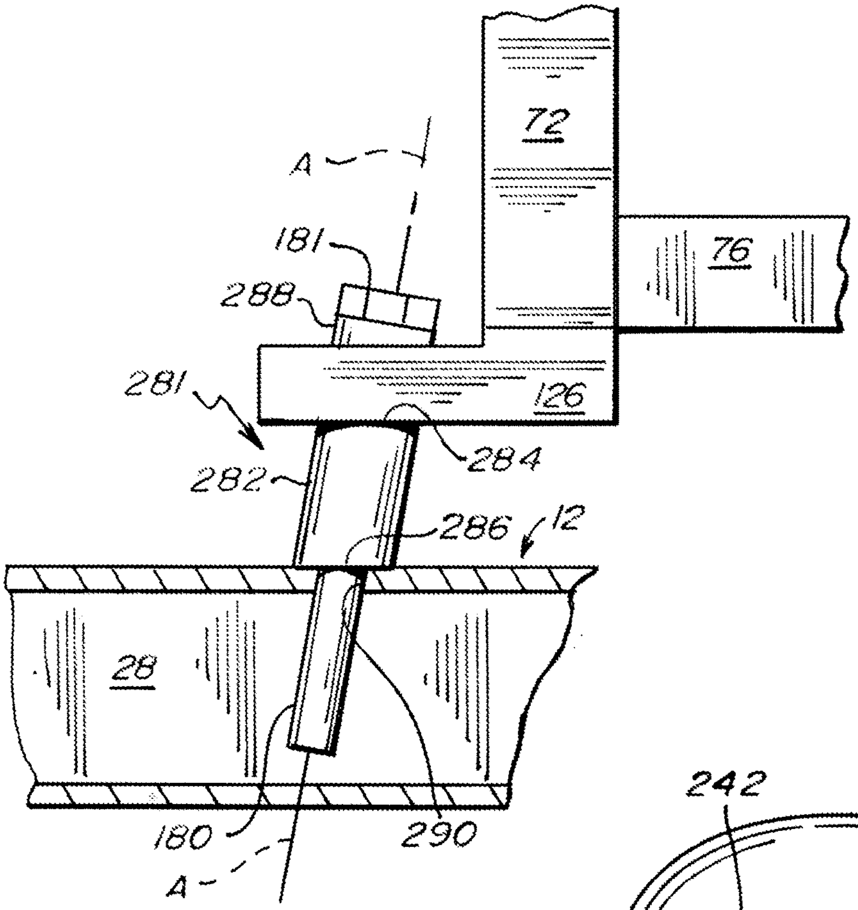
FIG. 6A is a detail view of an alternate lower pivot connection between a gate and a barrier frame of the gate apparatus of FIG. 1 showing the faces of the pivot connection riding upon each other.
Figure 6B:
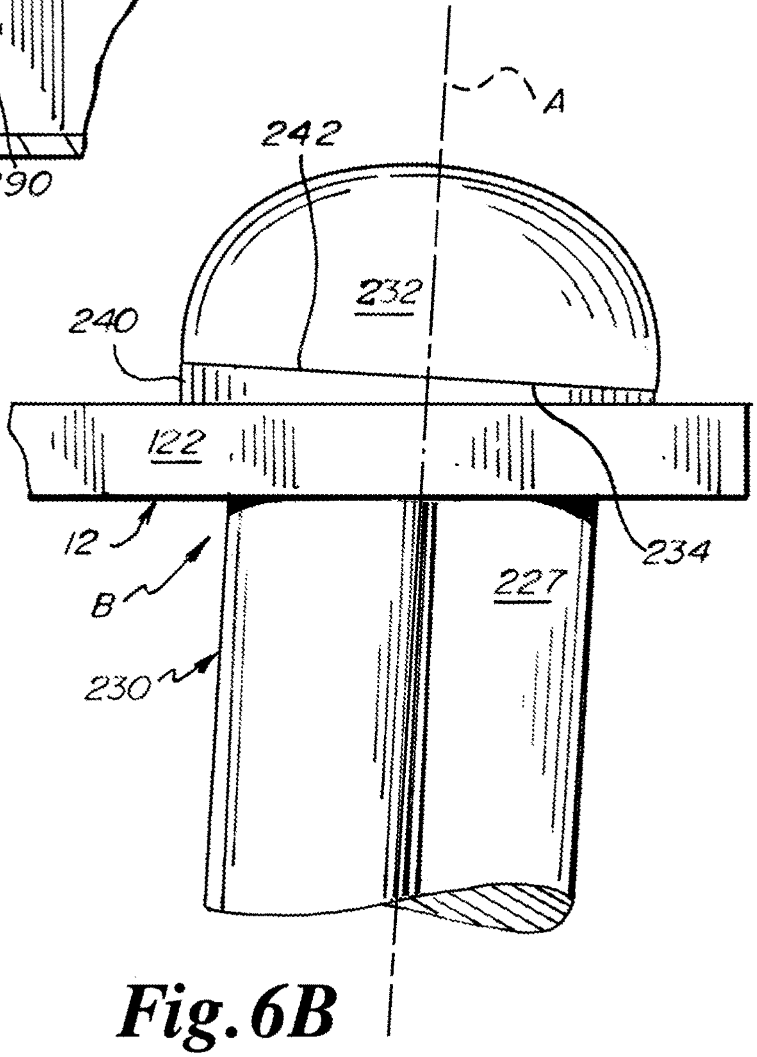
FIG. 6B is a detail view of the alternate upper pivot connection of FIG. 4B, showing the faces of the pivot connection riding upon each other.

In the embodiments of the pivot connections shown in FIG. 3A and FIG. 3B, the horizontal and vertical support members of the gate 14 may be slightly oblique relative to the horizontal and vertical support members of the barrier frame 12. This obliqueness is caused by shaving merely one end of spacer 176 to be oblique so as to align pin 180 with pivot axis A or by providing for the singular frame portion 206. However, this obliqueness is difficult to detect visually with the human eye. This obliqueness of the gate 14 may be cured by providing a pivot connection 281 shown in FIG. 6A, where such pivot connection 281 includes a spacer 282 having a pair of ends 284, 286 that are parallel to each other, as opposed to the ends of spacer 176 in FIG. 3A, where the ends are oblique relative to each other so as to align the pivot pin 180 on axis A. Spacer 282 is tubular. Pivot connection further includes a spacer 288 disposed between pin head 181 and piece 126. Spacer 288 is triangular in section. The hole or opening 290 in the upper portion of horizontal support member 28 may be drilled to be aligned on axis A, whereas in the pivot connection of FIG. 3A hole 188 is drilled vertically, but whose diameter may be slightly larger than the diameter of pin 180 to permit a tilting of pin 180. Spacers 282 and 288 are nonrotatably fixed on pivot pin 180. Pivot connection 281 of FIG. 6A may be used in combination with the pivot connection 230 of FIGS. 4B and 6B. Whereas FIG. 4B shows pivot connection 230 immediately prior to operation, FIG. 6B shows the pivot connection 230 in operation where face 234 is riding on face 242 of spacer 240. With the embodiments of FIGS. 6A and 6B, the horizontal support members of gate 14 are aligned with the horizontal support members of barrier 12 and the vertical support members of gate 14 run parallel to the horizontal support members of barrier 12.

A part or parts from one embodiment may be added to another embodiment. A part or parts from one embodiment may be replaced with a part or parts of another embodiment. In other words, the invention may feature a first part from a first embodiment, a second part from a second embodiment, a third part from a third embodiment, a fourth part from a fourth embodiment, and so on. Features may be interchanged between one or more embodiments.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A pressurized gate apparatus that is engaged between first and second vertically running surfaces and off a floor extending between the two vertically running surfaces, comprising:

a) a barrier frame in generally a first plane;

b) a gate engaged to the barrier frame and swingable into and out of the barrier frame and into and out of said first plane, said gate having a pivot side and a latch side;

c) the barrier frame having a first inner vertical support member, a first outer vertical support member, a first upper horizontally extending portion, and a first lower horizontally extending portion, the first inner and outer vertical support members extending adjacent to each other, the first upper and lower horizontally extending portions extending parallel to each other, the first inner vertical support member being adjacent to the pivot side of the gate, the first inner vertical support member having an axis;

d) the barrier frame further having a second inner vertical support member, a second outer vertical support member, a second upper horizontally extending portion, and a second lower horizontally extending portion, the second inner and outer vertical support members extending adjacent to each other, the second upper and lower horizontally extending portions extending parallel to each other, the second inner vertical support member being adjacent to the latch side of the gate, the second inner vertical support member having an axis, the second lower horizontally extending portion having an axis;

e) a first and upper pivot connection between the gate and the barrier frame;

f) a second and lower pivot connection between the gate and the barrier frame;

g) the barrier frame being a pressure frame and including first and second ends, the first end including the first inner and outer vertical support members, the second end including the second inner and outer vertical support members;

h) each of the second inner and outer vertical support members of the second end of the barrier frame manufactured to be obtuse relative the axis of the second lower horizontally extending portion of the barrier frame;

i) said gate being between said first and second ends;

j) the first and second ends being relatively squeezable together between said two vertically running surfaces to thereby resiliently push back against the vertically running surfaces such that the barrier frame is fixed between the two vertically running surfaces and such that the axis of each of the second inner and outer vertical support members and the axis of the second lower horizontally extending portion are pushed into about a right angle relationship;

k) the first and second ends being relatively squeezable together by first, second, third, and fourth screw apparatus, the first screw apparatus engaging the first upper horizontally extending portion of the barrier frame, the second screw apparatus engaging the first lower horizontally extending portion of the barrier frame, the third screw apparatus engaging the second upper horizontally extending portion of the barrier frame, and the fourth screw apparatus engaging the second lower horizontally extending portion of the barrier frame, the first and second screw apparatus engaging the first vertically running surface, the third and fourth screw apparatus engaging the second vertically running surface;

l) The gate including first, second, third, and fourth corner portions, the gate engaging the barrier frame at each of the first, second, third, and fourth corner portions, the first and upper pivot connection being engaged at the first corner portion, the second and lower pivot connection being engaged at the second corner portion, an upper latch being engaged at the third corner portion and extending between the third corner portion and the barrier frame, and a lower latch being engaged at the fourth corner portion and extending between the fourth corner portion and the barrier frame;

m) said first and upper and second and lower pivot connections establishing a swing axis on which the gate swings, said swing axis being oblique relative to the vertical axis of the first inner vertical support member; and n) the first and upper pivot connection between the gate and the barrier frame comprising:

i) a swinging portion that is fixed to the gate such that, when the gate swings, the swinging portion swings with the gate;

ii) a receiver portion that is fixed to the frame, the receiver portion receiving the swinging portion that is fixed to the gate;

iii) the receiver portion having a face, the face having a flat portion; and iv) the flat portion being disposed obliquely relative to the vertical axis of the first inner vertical support member, the swinging portion riding on the flat portion.

2. A pressurized gate apparatus that is engaged between first and second vertically running surfaces and off a floor extending between the two vertically running surfaces, comprising:

a) a barrier frame in generally a first plane;

b) a gate engaged to the barrier frame and swingable into and out of the barrier frame and into and out of said first plane, said gate having a pivot side and a latch side;

c) the barrier frame having a first inner vertical support member, a first outer vertical support member, a first upper horizontally extending portion, and a first lower horizontally extending portion, the first inner and outer vertical support members extending adjacent to each other, the first upper and lower horizontally extending portions extending parallel to each other, the first inner vertical support member being adjacent to the pivot side of the gate, the first inner vertical support member having an axis;

d) the barrier frame further having a second inner vertical support member, a second outer vertical support member, a second upper horizontally extending portion, and a second lower horizontally extending portion, the second inner and outer vertical support members extending adjacent to each other, the second upper and lower horizontally extending portions extending parallel to each other, the second inner vertical support member being adjacent to the latch side of the gate, the second inner vertical support member having an axis, the second lower horizontally extending portion having an axis;

e) a first and upper pivot connection between the gate and the barrier frame;

f) a second and lower pivot connection between the gate and the barrier frame;

g) the barrier frame being a pressure frame and including first and second ends, the first end including the first inner and outer vertical support members, the second end including the second inner and outer vertical support members;

h) each of the second inner and outer vertical support members of the second end of the barrier frame manufactured to be obtuse relative the axis of the second lower horizontally extending portion of the barrier frame;

i) said gate being between said first and second ends;

j) the first and second ends being relatively squeezable together between said two vertically running surfaces to thereby resiliently push back against the vertically running surfaces such that the barrier frame is fixed between the two vertically running surfaces and such that the axis of each of the second inner and outer vertical support members and the axis of the second lower horizontally extending portion are pushed into about a right angle relationship;

k) the first and second ends being relatively squeezable together by first, second, third, and fourth screw apparatus, the first screw apparatus engaging the first upper horizontally extending portion of the barrier frame, the second screw apparatus engaging the first lower horizontally extending portion of the barrier frame, the third screw apparatus engaging the second upper horizontally extending portion of the barrier frame, and the fourth screw apparatus engaging the second lower horizontally extending portion of the barrier frame, the first and second screw apparatus engaging the first vertically running surface, the third and fourth screw apparatus engaging the second vertically running surface;

l) The gate including first, second, third, and fourth corner portions, the gate engaging the barrier frame at each of the first, second, third, and fourth corner portions, the first and upper pivot connection being engaged at the first corner portion, the second and lower pivot connection being engaged at the second corner portion, an upper latch being engaged at the third corner portion and extending between the third corner portion and the barrier frame, and a lower latch being engaged at the fourth corner portion and extending between the fourth corner portion and the barrier frame;

m) said first and upper and second and lower pivot connections establishing a swing axis on which the gate swings; and n) the first and upper pivot connection between the gate and the barrier frame comprising:

i) a swinging portion that is fixed to the gate such that, when the gate swings, the swinging portion swings with the gate;

ii) a receiver portion that is fixed to the frame, the receiver portion receiving the swinging portion that is fixed to the gate;

iii) the receiver portion having a face, the face having a flat portion; and iv) the flat portion being disposed obliquely relative to the vertical axis of the first inner vertical support member, the swinging portion riding on the flat portion.

* * * * *